(12) United States Patent
Hendrickson et al.

(10) Patent No.: US 9,506,390 B1
(45) Date of Patent: Nov. 29, 2016

(54) DISTRIBUTED CONTROL OF SELECTIVE CATALYTIC REDUCTION SYSTEMS

(71) Applicant: Ford Global Technologies, LLC, Dearborn, MI (US)

(72) Inventors: Cory Scott Hendrickson, Ann Arbor, MI (US); Devesh Upadhyay, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 13 days.

(21) Appl. No.: 14/743,206

(22) Filed: Jun. 18, 2015

(51) Int. Cl.
*F01N 3/20* (2006.01)
*F01N 3/08* (2006.01)
*F02P 5/153* (2006.01)
*F02D 41/02* (2006.01)

(52) U.S. Cl.
CPC .............. *F01N 3/208* (2013.01); *F01N 3/0842* (2013.01); *F02D 41/0235* (2013.01); *F02P 5/153* (2013.01); *F01N 2570/14* (2013.01); *F01N 2610/02* (2013.01)

(58) Field of Classification Search
CPC ........ F01N 3/20; F01N 3/208; F01N 3/0842; F01N 2610/02; F01N 2570/14; F02D 41/0235; F02P 5/153
See application file for complete search history.

(56) References Cited

U.S. PATENT DOCUMENTS

| 7,874,147 B2* | 1/2011 | Khadiya ................. F01N 3/035 60/274 |
| 8,671,666 B2* | 3/2014 | Yezerets ................. F01N 3/208 60/274 |
| 2011/0023463 A1 | 2/2011 | Dobson et al. |
| 2011/0023591 A1 | 2/2011 | Dobson et al. |
| 2012/0310507 A1 | 12/2012 | Auckenthaler |
| 2014/0032189 A1 | 1/2014 | Hehle et al. |

FOREIGN PATENT DOCUMENTS

KR  20140137498 A  * 12/2014  .............. F01N 3/20

OTHER PUBLICATIONS

Willems et al., "Experimental Demonstration of a New Model-Based SCR Control Strategy for Cleaner Heavy-Duty Diesel Engines," IEEE Transactions on Control Systems Technology, vol. 19, No. 5, Sep. 2011, 9 pages.

* cited by examiner

*Primary Examiner* — Hieu T Vo
(74) *Attorney, Agent, or Firm* — Julia Voutyras; Alleman Hall McCoy Russell & Tuttle LLP

(57) ABSTRACT

Methods and systems are provided for modeling a reductant temperature and storage distribution of a SCR catalyst axially and radially. In one example, a method may include modeling an expected distribution of stored reductant among a plurality of axial zones and a plurality of radial zones of an SCR catalyst arranged in an engine exhaust passage and comparing the expected distribution with a reductant storage setpoint of each zone to adjust radial and axial storage locations.

20 Claims, 9 Drawing Sheets

DISTRIBUTED CONTROL OF SELECTIVE CATALYTIC REDUCTION SYSTEMS

FIELD

The present description relates generally to methods and systems for distributed control of a selective catalytic reduction (SCR) catalyst arranged in a vehicle emission control system.

BACKGROUND/SUMMARY

Emission control systems of motor vehicles, such as motor vehicles propelled by gasoline-fueled or diesel-fueled internal combustion engines, may include one or more catalysts configured to reduce the level of emissions produced during fuel combustion. For example, a SCR catalyst may be included in an emission control system to reduce levels of nitrogen oxides ($NO_x$) emitted by the engine following fuel combustion. A reductant injected into the exhaust passage upstream of the SCR catalyst is adsorbed onto a substrate within the SCR catalyst, and as exhaust gas flows through the SCR catalyst, the reductant stored in the SCR catalyst reacts with $NO_x$ in the exhaust gas. The reductant may be urea, which transforms into ammonia ($NH_3$) prior to being adsorbed onto the surfaces within the SCR catalyst. The $NH_3$ stored by the SCR catalyst reacts with $NO_x$ in the exhaust gas to create byproducts such as $N_2$ and $H_2O$.

The amount of reductant injected upstream of the SCR catalyst as well as the reductant storage capacity of the SCR catalyst impacts the $NO_x$ conversion efficiency of the SCR catalyst. The storage capacity of an SCR catalyst varies based on the temperature of the SCR catalyst. For example, if a large amount of reductant is injected upstream of the SCR catalyst and stored in the SCR catalyst, a high $NO_x$ conversion efficiency may be achieved. However, if a large amount of reductant is injected upstream of the SCR catalyst and the SCR catalyst does not have sufficient storage capacity, some of the reductant may "slip" out of the SCR catalyst and then out of the exhaust tailpipe, resulting in undesirable exhaust emissions (e.g., excessive $NH_3$ emissions). Conversely, if a small amount of reductant is injected, NOx conversion efficiency may decrease, as there may not be enough reductant stored in the SCR catalyst to react with and reduce the $NO_x$ in the exhaust gas flowing through the SCR catalyst. This may result in harmful $NO_x$ emissions from the exhaust tailpipe of the vehicle.

In some examples, the vehicle controller is programmed to maximize NOx conversion efficiency and minimize reductant slip by adjusting the reductant injection mass flow rate based on the relationship between a modeled reductant storage level and a reductant storage setpoint. For example, as it may be difficult to directly measure the level of reductant stored in the SCR catalyst during vehicle operation, a control-oriented model may be used to estimate the level of reductant stored in the SCR catalyst at a given time. Further, as $NO_x$ conversion efficiency and reductant slip are highly dependent on the temperature of the SCR catalyst, the temperature must also factor into the control strategy. Some control-oriented models utilize a zero-dimensional lumped parameter structure for the sake of simplicity and computational efficiency. In such models, a single node defines all dynamics of the SCR catalyst, and axial distribution of reductant storage and axial/radial temperature variations are ignored. Thus, such models may be restricted in their ability to capture the effects of temperature gradient and/or reductant storage distribution on catalyst dynamics.

Other example control-oriented models include distributed models, which discretize the SCR system into a number of elements or slices each having respective inputs, outputs, and internal states such as reductant storage level and substrate temperature. For example, U.S. 2014/0032189 describes a method for a model-based determination of temperature distribution within an exhaust gas post-treatment unit, where the model virtually segments the unit axially and radially. During steady operating states, the radial temperature distribution from the unit to its surroundings is taken into account, whereas during non-steady operating states, the heat transfer from the exhaust gas flowing axially through the unit to the unit is taken into account.

However, the inventors herein have recognized potential issues with the control-oriented models described above. As one example, models focusing on temperature distribution alone may not adequately account for reductant storage distribution in an SCR catalyst. As another example, the radial elements modeled in the above approaches have fixed dimensions, and thus cannot accurately approximate the changes in radial dynamics of an SCR catalyst that occur in real time. Only the inventors herein have recognized that these and other issues with prior approaches may be addressed by a method for a vehicle engine emission control system in which various vehicle operating parameters are adjusted to maximize the performance of an SCR catalyst, where the adjustments are based on a comparison of an estimated spatial distribution of reductant stored in an SCR catalyst with a desired spatial distribution of reductant stored in the catalyst. For example, if radial adjustment of the spatial distribution is desired, a pressure at which reductant is injected into the SCR catalyst is adjusted. Further, if axial adjustment of the spatial distribution is desired, exhaust gas temperature and/or NOx concentration is adjusted. For example, non-uniform radial and axial reductant storage and temperature profiles may model actual catalyst dynamics, such that SCR control more readily accommodates real-time catalyst and vehicle conditions. The resulting robust SCR control may advantageously increase NOx conversion efficiency and decrease ammonia slip so as to meet increasingly stringent emission control regulations.

Only Applicant has identified strategies for adjusting vehicle operating parameters based on radial and axial models of the SCR catalyst in order to achieve a desired performance of the SCR catalyst. For example, Applicant has recognized that the radial distribution of reductant at front face of an SCR catalyst may be actively adjusted via adjustment of the dosing pressure of reductant injected upstream of the SCR catalyst, where the adjustment is optionally timed to correspond with a desired exhaust flow rate. However, Applicant has recognized that adjustment of reductant injection alone may not provide sufficient control to achieve desired reductant storage setpoints throughout the SCR catalyst, for example because adjustment of reductant injection alone cannot influence the axial storage location of reductant. To overcome this limitation, Applicant has recognized that active perturbation of the temperature of exhaust gas entering the SCR catalyst may cause reductant stored in a front portion of the SCR catalyst (e.g., closer to an inlet of the catalyst with respect to the flow of exhaust gas through the catalyst) to be moved towards a back portion of the SCR catalyst (e.g., closer to the outlet of the catalyst), thereby advantageously increasing NOx reduction efficiency, especially at high rates of exhaust gas flow through the catalyst. Further, Applicant has recognized that active perturbation of the NOx concentration in the exhaust gas entering the SCR catalyst may advantageously reduce back-skewing of stored reductant (e.g., the tendency of reductant to be stored toward the back of the catalyst), thereby advantageously decreasing reductant slip and increasing fuel economy.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1, 2A-2C, and 3A-3B are shown approximately to scale.

DETAILED DESCRIPTION

Figure 1:
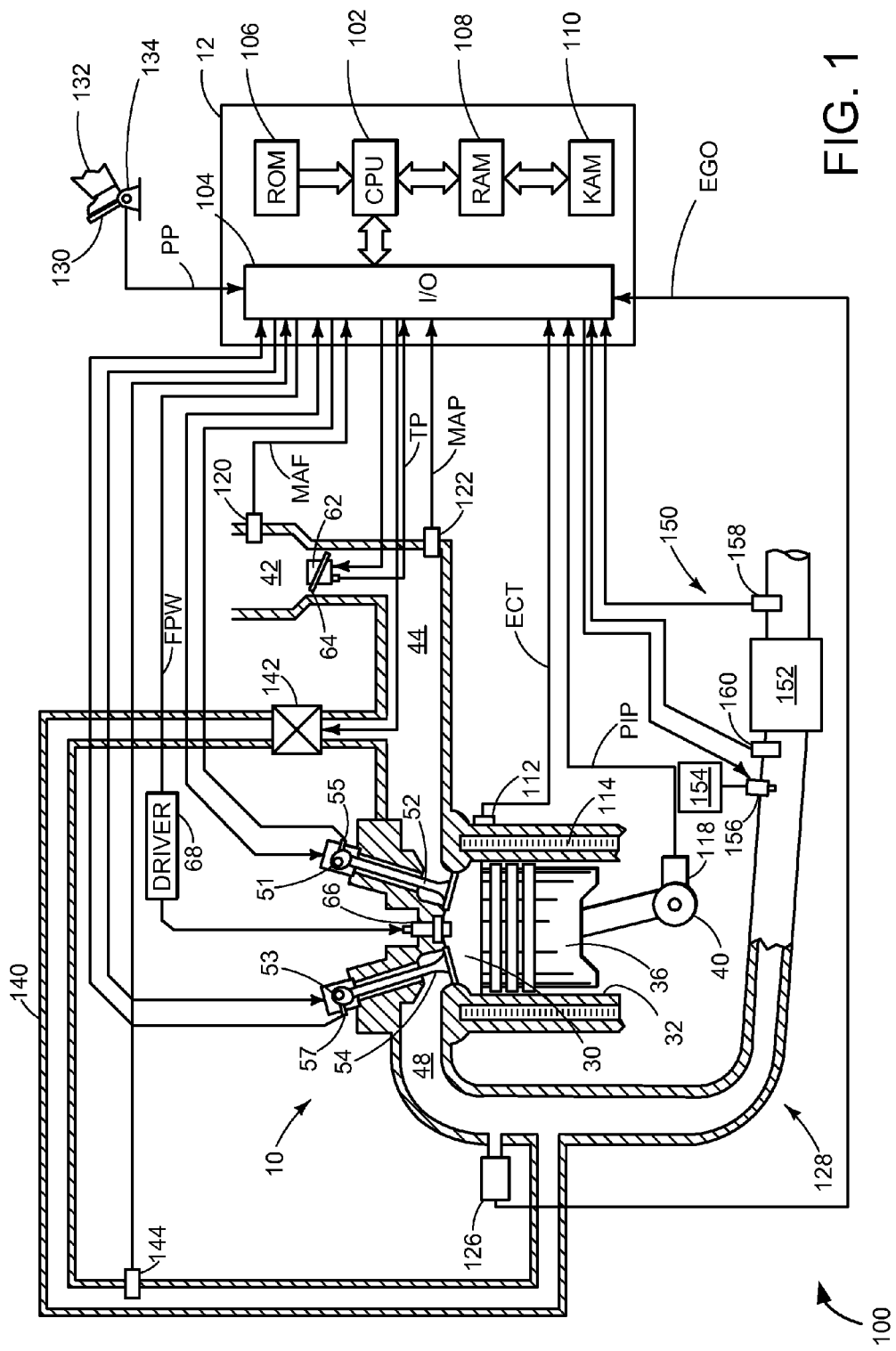
FIG. 1 is a schematic diagram of an example engine system.
Figure 6:
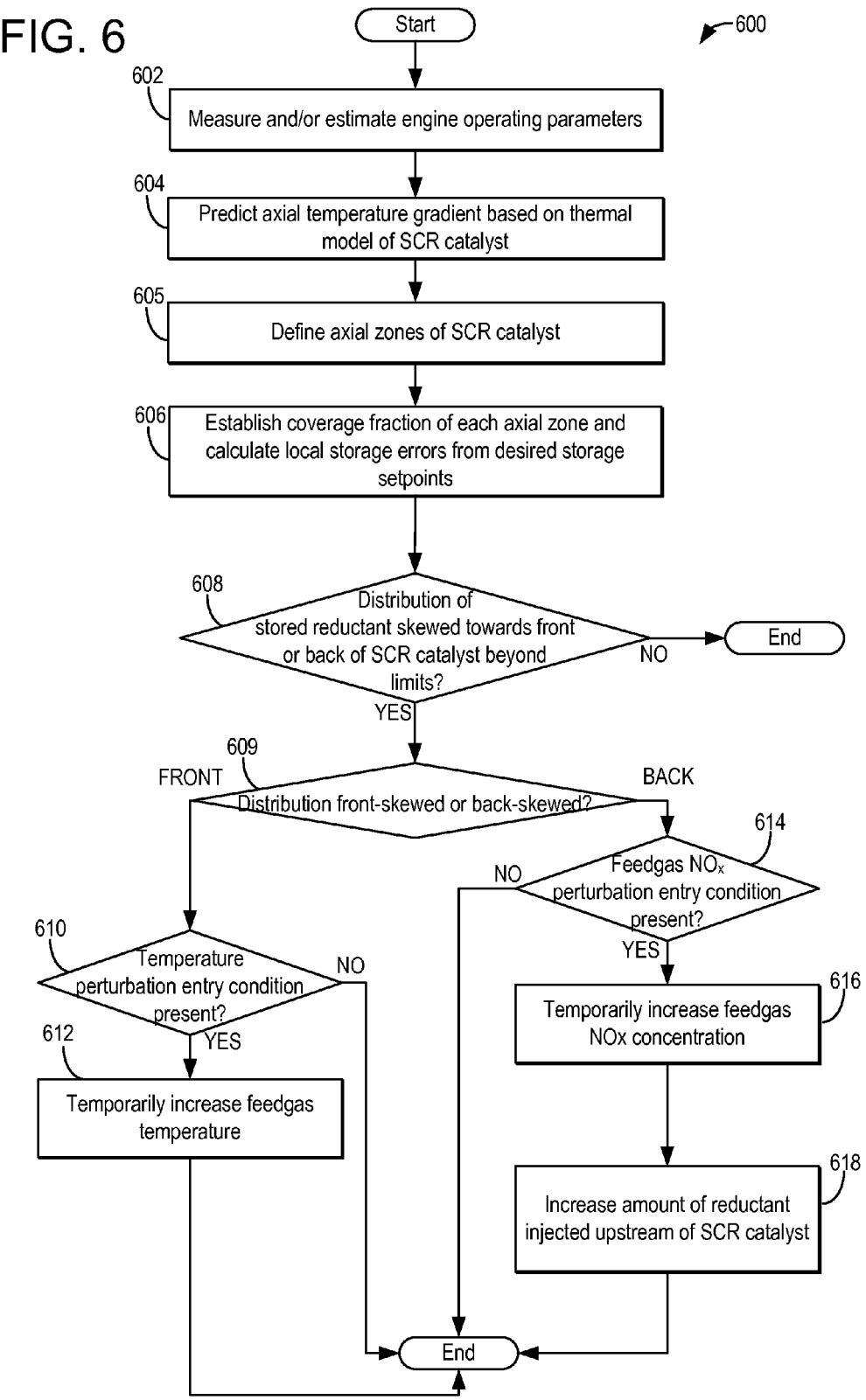
FIG. 6 is a flow chart depicting a method for adjusting axial reductant distribution in an SCR catalyst.
Figure 7:
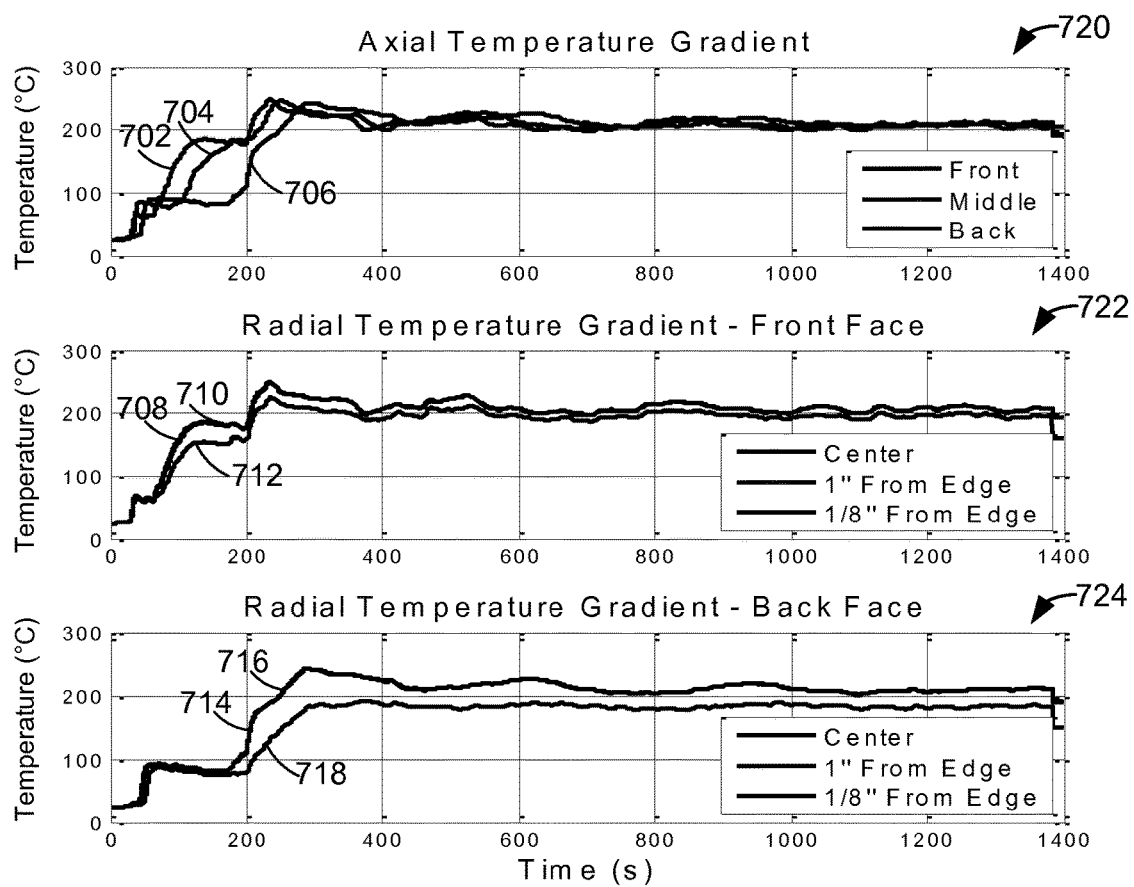
FIG. 7 depicts graphs of experimental axial and radial temperature gradients of an SCR catalyst over time.
Figure 8:
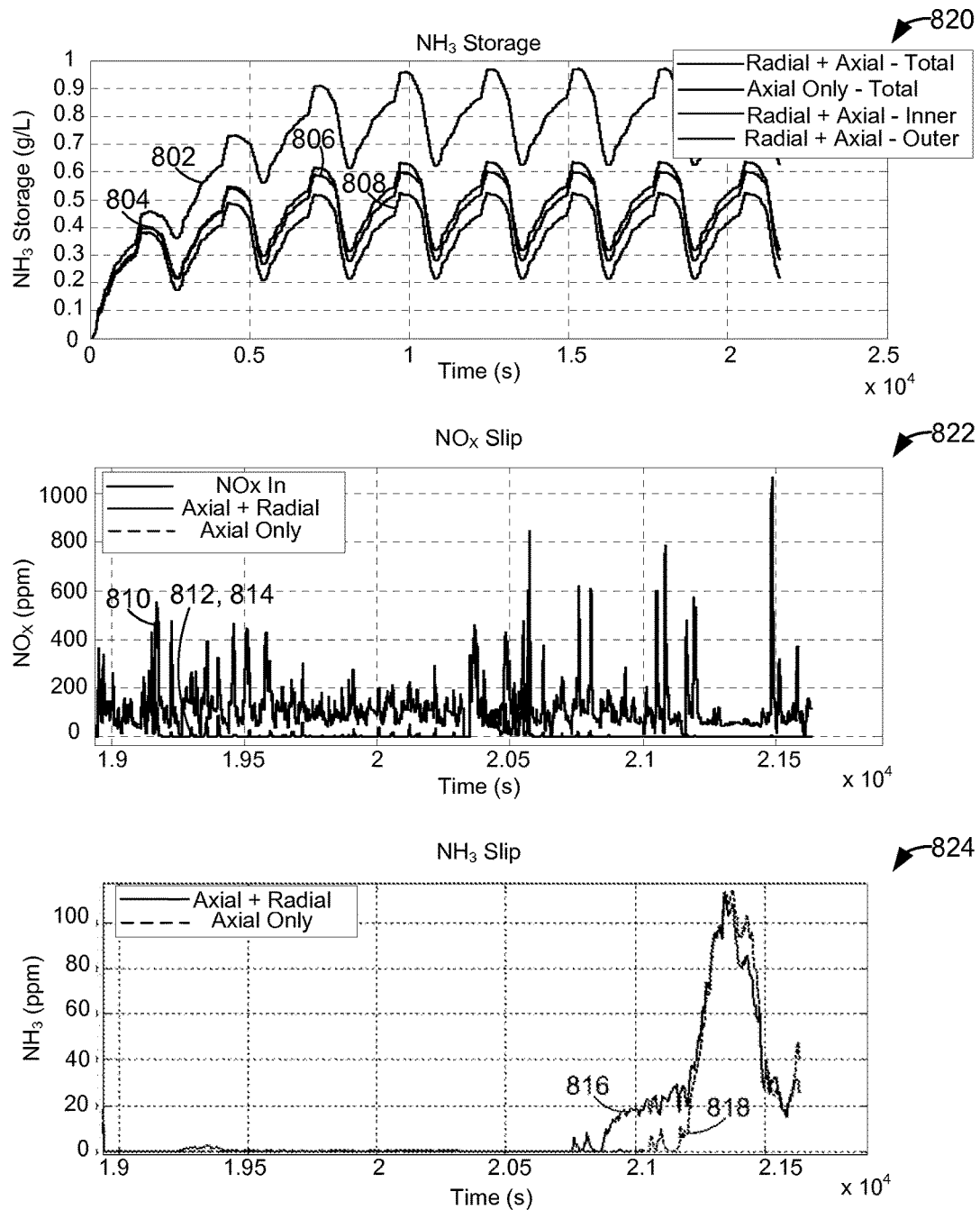
FIG. 8 depicts graphs of SCR catalyst performance achieved via simulations which employ different control methodologies for spatial distribution of stored reductant.

The following description relates to methods and systems for modeling radial and axial reductant distribution in a SCR catalyst, such as the catalyst included in the engine system of FIG. 1. For example, the method allows for modeling a plurality of axial and radial zones, as shown in FIGS. 2A-2C and 3A-3B. The radial elements or zones may have time varying volume ratios which may adjust based on exhaust gas temperature, ambient temperature, and vehicle speed, as shown in FIG. 4. A controller may be configured to perform control routines, such as the methods of FIGS. 5A-5B, to adjust a radial storage location of the reductant by actuating an injector to adjust its spray pattern into the SCR catalyst. The controller may then adjust reductant dosing control by adjusting axial storage location of the reductant in the SCR catalyst, as shown at FIG. 6. The effect of temperature gradients is depicted in FIG. 7. By taking into account axial and radial temperature gradients, as well as an axial storage and dynamic radial storage distribution, the model may provide more robust control of the SCR system as shown in FIG. 8. In this way, SCR system estimations regarding reductant slip and NOx concentrations may be continuously corrected depending of vehicle operating conditions, thus reducing reductant slip and improving exhaust emissions.

Referring now to FIG. 1, a schematic diagram showing one cylinder of a multi-cylinder engine 10, which may be included in a vehicle propulsion system 100 of an automobile, is illustrated. The engine 10 may be controlled at least partially by a controller 12 and by input from a vehicle operator 132 via an input device 130. In this example, the input device 130 includes an accelerator pedal and a pedal position sensor 134 for generating a proportional pedal position signal PP. A combustion chamber (e.g., cylinder) 30 of the engine 10 may include combustion chamber walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via a respective intake valve 52 and exhaust valve 54. In some embodiments, the combustion chamber 30 may include two or more intake valves and/or two or more exhaust valves.

In the example depicted in FIG. 1, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by controller 12 to vary valve operation. The position of the intake valve 52 and the exhaust valve 54 may be determined by position sensors 55 and 57, respectively. In alternative embodiments, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

In some embodiments, each cylinder of the engine 10 may be configured with one or more fuel injectors for providing fuel thereto. As a non-limiting example, the cylinder 30 is shown including one fuel injector 66. The fuel injector 66 is shown coupled directly to the cylinder 30 for injecting fuel directly therein in proportion to the pulse width of signal FPW received from controller 12 via an electronic driver 68. In this manner, the fuel injector 66 provides what is known as direct injection (hereafter also referred to as "DI") of fuel into the combustion cylinder 30.

It will be appreciated that in an alternate embodiment, the injector 66 may be a port injector providing fuel into the intake port upstream of the cylinder 30. It will also be appreciated that the cylinder 30 may receive fuel from a plurality of injectors, such as a plurality of port injectors, a plurality of direct injectors, or a combination thereof.

In one example, the engine 10 is a diesel engine that combusts air and diesel fuel through compression ignition. In other non-limiting embodiments, the engine 10 may combust a different fuel including gasoline, biodiesel, or an alcohol containing fuel blend (e.g., gasoline and ethanol or gasoline and methanol) through compression ignition and/or spark ignition.

The intake passage 42 may include a throttle 62 having a throttle plate 64. In this particular example, the position of the throttle plate 64 may be varied by controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to controller 12 by throttle position signal TP. The intake passage 42 may include a mass air flow sensor 120 and a manifold air pressure sensor 122 for providing respective signals, MAF and MAP, to controller 12.

Further, in the disclosed embodiments, an exhaust gas recirculation (EGR) system may route a desired portion of exhaust gas from the exhaust passage 48 to the intake manifold 44 via an EGR passage 140. The amount of EGR provided to the intake manifold 44 may be varied by controller 12 via an EGR valve 142. By introducing exhaust gas to the engine 10, the amount of available oxygen for combustion is decreased, thereby reducing combustion flame temperatures and reducing the formation of NOx for example. As depicted, the EGR system further includes an EGR sensor 144 which may be arranged within the EGR passage 140 and may provide an indication of one or more of pressure, temperature, and concentration of the exhaust gas. Under some conditions, the EGR system may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

An exhaust system 128 includes an exhaust gas air-fuel ratio sensor 126 coupled to the exhaust passage 48 upstream of an exhaust gas treatment system 150. The sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. The exhaust gas treatment system 150 is shown arranged along the exhaust passage 48 downstream of the exhaust gas air-fuel ratio sensor 126. Herein, exhaust gas entering the exhaust gas treatment system after being exhausted from the engine may alternately be referred to as feedgas.

In the example shown in FIG. 1, the exhaust gas treatment system 150 includes a urea-based SCR system. The depicted SCR system include at least one reduction catalyst (e.g., SCR catalyst 152 shown in FIG. 1), a reductant storage tank (e.g., urea storage reservoir 154 shown in FIG. 1), and a reductant dosing system (which may include, for example, urea injector 156 shown in FIG. 1). In other embodiments, however, the exhaust gas treatment system 150 may additionally or alternatively include other components, such as a particulate filter, a lean $NO_x$ trap, a three-way catalyst, various other emission control devices, or combinations thereof. For example, urea injector 156 may be positioned upstream of SCR catalyst 152 and downstream of an oxidation catalyst.

In the depicted example, the urea injector 156 injects urea from the urea storage reservoir 154 into exhaust passage 48 upstream of SCR catalyst 152. However, various alternative approaches may be used for introducing reductant upstream of SCR catalyst 152, such as injecting or metering solid urea pellets that generate an ammonia vapor to the SCR catalyst 152. In another example, a lean $NO_x$ trap may be positioned upstream of the SCR catalyst 152 to generate $NH_3$ for the SCR catalyst 152, depending on the degree or richness of the air-fuel ratio fed to the lean $NO_x$ trap.

In the depicted embodiment, the exhaust gas treatment system 150 further includes a tailpipe exhaust gas sensor 158 positioned downstream of the SCR catalyst 152. In one example, tailpipe exhaust gas sensor 158 may be a $NO_x$ sensor which is configured to measure an amount of post-SCR catalyst $NO_x$ prior to its release into the atmosphere via the tailpipe of exhaust passage 48. As shown, exhaust gas treatment system 150 also includes a feedgas sensor 160 positioned upstream of the SCR catalyst 152 and downstream of urea injector 156 in the embodiment of FIG. 1. In one example, feedgas sensor 160 may also be a $NO_x$ sensor which is configured to measure an amount of $NO_x$ in the exhaust gas flowing in the exhaust passage upstream of the SCR catalyst.

A level of $NO_x$ conversion efficiency of the SCR system may be determined based on the output(s) of one or more of tailpipe exhaust gas sensor 158 and feedgas sensor 160. For example, the level of $NO_x$ conversion efficiency of the SCR system may be determined by comparing $NO_x$ levels upstream of the SCR catalyst (e.g., $NO_x$ levels measured by sensor 160) with $NO_x$ levels downstream of the SCR catalyst (e.g., $NO_x$ levels measured by sensor 158). The determination of the level of $NO_x$ conversion efficiency of the SCR catalyst may also be based on the output of exhaust gas air-fuel ratio sensor 126. In other examples, exhaust gas sensors 158 and 160 may each be any suitable sensor for determining an exhaust gas constituent concentration, such as a UEGO, EGO, HEGO, HC, CO sensor, etc. Additionally or alternatively, a feedgas $NO_x$ model can be used to estimate the $NO_x$ concentration upstream of the SCR catalyst.

Controller 12 is shown in FIG. 1 as a microcomputer, including a microprocessor unit 102, input/output ports 104, an electronic storage medium for executable programs and calibration values shown as a read only memory chip 106 in this particular example, random access memory 108, keep alive memory 110, and a data bus. The controller 12 may be in communication with and, therefore, receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; a profile ignition pickup signal (PIP) from a Hall effect sensor 118 (or other type) coupled to the crankshaft 40; throttle position (TP) from a throttle position sensor; absolute manifold pressure signal, MAP, from the sensor 122; exhaust gas air/fuel ratio from sensor 126; and exhaust constituent concentration from sensors 160 and 158. An engine speed signal, RPM, may be generated by controller 12 from signal PIP.

The storage medium read-only memory 106 can be programmed with non-transitory, computer readable data representing instructions executable by the processor 102 for performing the methods described below as well as other variants that are anticipated but not specifically listed. Example methods are described herein with reference to FIGS. 5A-5B and 6.

As described above, FIG. 1 shows only one cylinder of a multi-cylinder engine. The description of the cylinder shown in FIG. 1 is equally applicable to the other cylinders of the multi-cylinder engine. For example, each cylinder may include its own set of intake/exhaust valves, fuel injector, spark plug, etc.

Figure 2B:
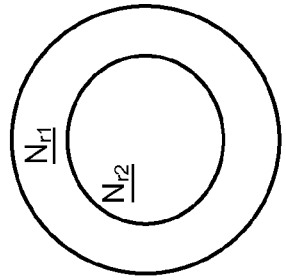
FIGS. 2A-2C depict different views of a model of an SCR catalyst wherein the SCR catalyst is segmented into axial and radial zones.
Figure 2C:
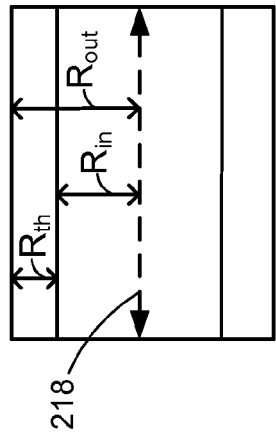
Figure 2A:
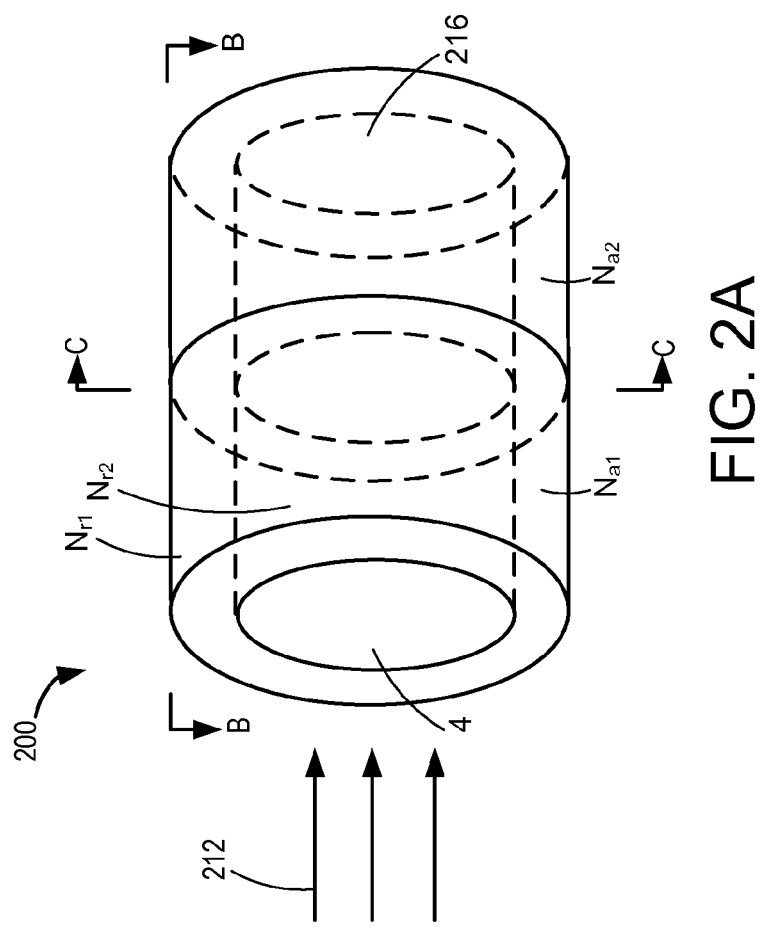

Turning now to FIG. 2A, it depicts a perspective view of an exemplary radial and axial model 200 of an SCR catalyst, such as SCR catalyst 152 of FIG. 1. Model 200 may be generated by a controller, such as controller 12 of FIG. 1, based on an embedded model of the SCR catalyst stored in non-transitory memory of the controller. For example, the controller may include instructions stored in non-transitory memory to generate a virtual model of the SCR catalyst by segmenting the embedded model of the SCR catalyst into a plurality of radial zones and/or a plurality of axial zones.

Arrows 212 illustrate the direction of exhaust flow entering the SCR catalyst modeled by model 200. Additionally, arrows 212 may also correspond to the direction of reductant sprayed by a reductant injector arranged upstream of the SCR catalyst such as urea injector 156 of FIG. 1.

In the embodiment shown in FIG. 2A, model 200 is divided into two radial zones. The two radial zones include an outer radial zone $N_{r1}$ and an inner radial zone $N_{r2}$. Outer radial zone $N_{r1}$ surrounds inner radial zone $N_{r2}$, such that inner radial zone $N_{r2}$ is modeled as a cylindrical core of the modeled SCR catalyst and outer radial zone $N_{r1}$ is modeled as a hollow cylinder. The circumference of inner radial zone $N_{r2}$ is coextensive with and equal to the circumference of the inner circumference of outer radial zone $N_{r1}$, and forms a boundary between the inner and outer radial zones. As shown, an outer circumference of the outer radial zone is concentric with the circumference of the inner radial zone and the inner circumference of the outer radial zone. The outer circumference of the outer radial zone may be coextensive with and equal to a circumference of the modeled SCR catalyst itself. During engine operation, the temperature of the outer radial zone may tend to be lower than the temperature of the inner radial zone. While the embodiment of FIG. 2A includes exactly two radial zones, it is contemplated that the model may include more than two radial zones. For example, the model may include three radial zones (e.g., $N_{r1}$, $N_{r2}$, $N_{r3}$), four radial zones (e.g., $N_{r1}$, $N_{r2}$, $N_{r3}$, $N_{r4}$), five radial zones (e.g., $N_{r1}$, $N_{r2}$, $N_{r3}$, $N_{r4}$, $N_{r5}$), six radial zones (e.g., $N_{r1}$, $N_{r2}$, $N_{r3}$, $N_{r4}$, $N_{r5}$, $N_{r6}$), or any other number of radial zones greater than two. In some examples, the sum of the volumes of all of the radial zones may be equal to the total volume of the modeled SCR catalyst. However, in other examples, only a partial radial model may be used, such that the sum of the volumes of all of the radial zones may be less than the total volume of the modeled SCR catalyst.

As further shown in FIG. 2A, model 200 is divided into two axial zones. The two axial zones include a front axial zone $N_{a1}$ and a back axial zone $N_{a2}$. Front axial zone $N_{a1}$ is bordered on a first axial side thereof by a front face 214 of the modeled SCR catalyst, and on a second axial side thereof by a first axial side of back radial zone $N_{a2}$. The front face 214 of the modeled SCR catalyst is an upstream face of the modeled SCR catalyst with respect to the flow of exhaust gas through the SCR catalyst represented by the model; the modeled SCR catalyst further includes an end face 216 which is a downstream face of the modeled SCR catalyst with respect to the flow of exhaust gas through the SCR catalyst represented by the model. After being treated by the SCR catalyst modeled by model 200, exhaust gases may flow through end face 216 as they exit the SCR catalyst. As shown, front face 214 and end face 216 are oriented in planes which are perpendicular to the direction of exhaust flow in the exhaust pipe immediately upstream of the SCR catalyst represented by model 200.

While the embodiment of FIG. 2A includes exactly two axial zones, it is contemplated that the model may include more than two axial zones. For example, the model may include three axial zones (e.g., $N_{a1}$, $N_{a2}$, $N_{a3}$), four axial zones (e.g., $N_{a1}$, $N_{a2}$, $N_{a3}$, $N_{a4}$), five axial zones (e.g., $N_{a1}$, $N_{a2}$, $N_{a3}$, $N_{a4}$, $N_{a5}$), six axial zones (e.g., $N_{a1}$, $N_{a2}$, $N_{a3}$, $N_{a4}$, $N_{a5}$, $N_{a6}$), or any other number of axial zones greater than two. In some examples, the sum of the volumes of all of the axial zones may be equal to the total volume of the modeled SCR catalyst. However, in other examples, only a partial axial model may be used, such that the sum of the volumes of all of the axial zones may be less than the total volume of the modeled SCR catalyst.

The temperature at each axial and radial zone may be estimated by the controller based on a thermal model of the SCR catalyst stored in non-transitory memory of the controller. In some examples, the thermal model may be a dynamic model in which estimated catalyst substrate temperatures at different locations in the SCR catalyst vary based on vehicle operating conditions, ambient influences, and flow restrictions, from aftertreatment devices, within the aftertreatment system. The thermal model may estimate the substrate or wall temperatures of the SCR catalyst at different locations in the SCR catalyst by modeling various forms of heat transfer in the system. These include heat transfer between the exhaust gas and substrate, heat loss to the atmosphere, conduction between adjacent axial or radial catalyst elements and, potentially, heat gained from the exothermic SCR chemical reactions. The rates of heat transfer may be determined by the system geometry, material properties, and system states, e.g. current exhaust gas temperature and mass flow rate, substrate temperature, and ambient temperature. For example, the thermal model may include estimated thermal gradients in radial and axial directions of the SCR catalyst. The thermal model may serve as a basis for the segmentation of the SCR catalyst into axial and radial zones in model 200, such that the number volume/dimension/relative position of each zone and optionally the number of zones may be based on the modeled thermal gradients. For example, in an embodiment having two radial zones and two axial zones such as the embodiment shown in FIGS. 2A-2C, a radius $R_{in}$ of the inner radial zone and a radial thickness of the outer zone (e.g., which is equal to the difference between the radius of the SCR catalyst itself and the radius of the inner radial zone) may be defined based on the thermal model of the SCR catalyst, as well as based on ambient temperature and a projected heat loss of the SCR catalyst to its surroundings. In some examples, ambient temperature, projected heat loss, and other parameters influencing temperatures within the SCR catalyst may be incorporated into the thermal model, whereas in other examples these parameters may factor into the determination of the zone dimensions in tandem with the thermal model FIG. 2B is a partial sectional view of model 200 taken along line B-B in FIG. 2A, in which radius $R_{in}$ of inner radial zone $N_{r2}$, radius $R_{out}$ of the modeled SCR catalyst, and radial thickness $R_{th}$ of outer radial zone $N_{r1}$ are shown. In the depicted example, radial thickness $R_{th}$ is equal to a difference between radius $R_{out}$ and radius $R_{in}$. Unlike radius $R_{in}$ and radial thickness $R_{th}$, radius $R_{out}$ is the radius of the SCR catalyst modeled by model 200, and thus has a fixed length which is equal to the radius of the SCR catalyst in examples where the SCR catalyst has a cylindrical shape, e.g., the distance between a central longitudinal axis 218 of the SCR catalyst and a point at the circumference of the SCR catalyst. In contrast, the length of inner radius $R_{in}$ as defined by the model varies based on the thermal model and other vehicle operating parameters. For example, the inner radius may vary as a function of a modeled radial temperature gradient of the SCR catalyst, ambient temperature, temperature of the incoming exhaust flow, vehicle speed, and projected heat loss, among other factors. Inner radius $R_{in}$ is therefore dynamic and may change (e.g., increase or decrease) during vehicle operation based on the modeled temperature gradient, as discussed in detail below with respect to FIG. 4.

The changes in inner radius $R_{in}$ during vehicle operation result in changes to the relative dimensions of the radial zones of model 200, and as such, volume ratios of the radial zones vary with time during vehicle operation. For example, the volume of the modeled outer radial zone $N_{r1}$ may expand and contract with colder and warmer ambient temperatures, respectively. The volume may be adjusted continuously in time as vehicle operating parameters change, or alternatively, the volume may be adjusted only when vehicle operating parameters cross predefined thresholds. For example, the volume ratio of the inner and outer radial zones in model 200 may change when ambient temperature crosses thresholds (e.g., thresholds defining cold, medium, and hot temperature ranges). This expansion and contraction corresponds to changes in temperature occurring at the SCR catalyst in real time.

FIG. 2C is a sectional view of model 200 taken along line C-C of FIG. 2A. As shown in FIG. 2C, outer radial zone $N_{r1}$ appears in cross-section as an annular region concentric to inner radial zone $N_{r2}$. As discussed above, the radial thickness $R_{th}$ of outer radial zone $N_{r1}$ may fluctuate based on a thermal model of the SCR catalyst and/or based on vehicle operating parameters.

Figure 3A:
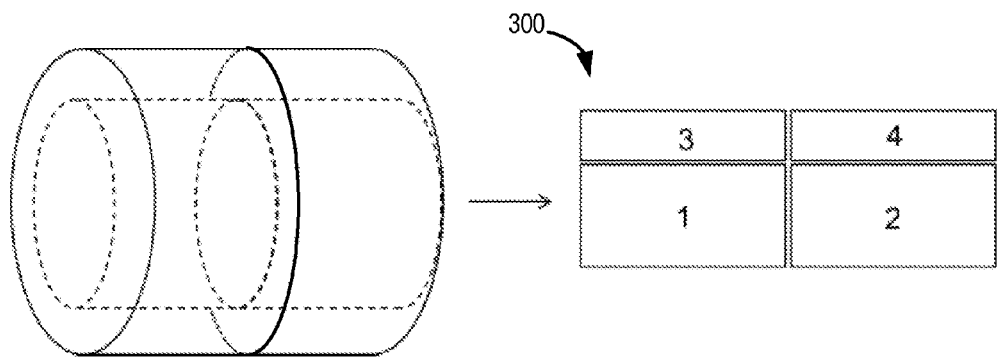
FIGS. 3A-3B depict other exemplary models of an SCR catalyst.
Figure 4:
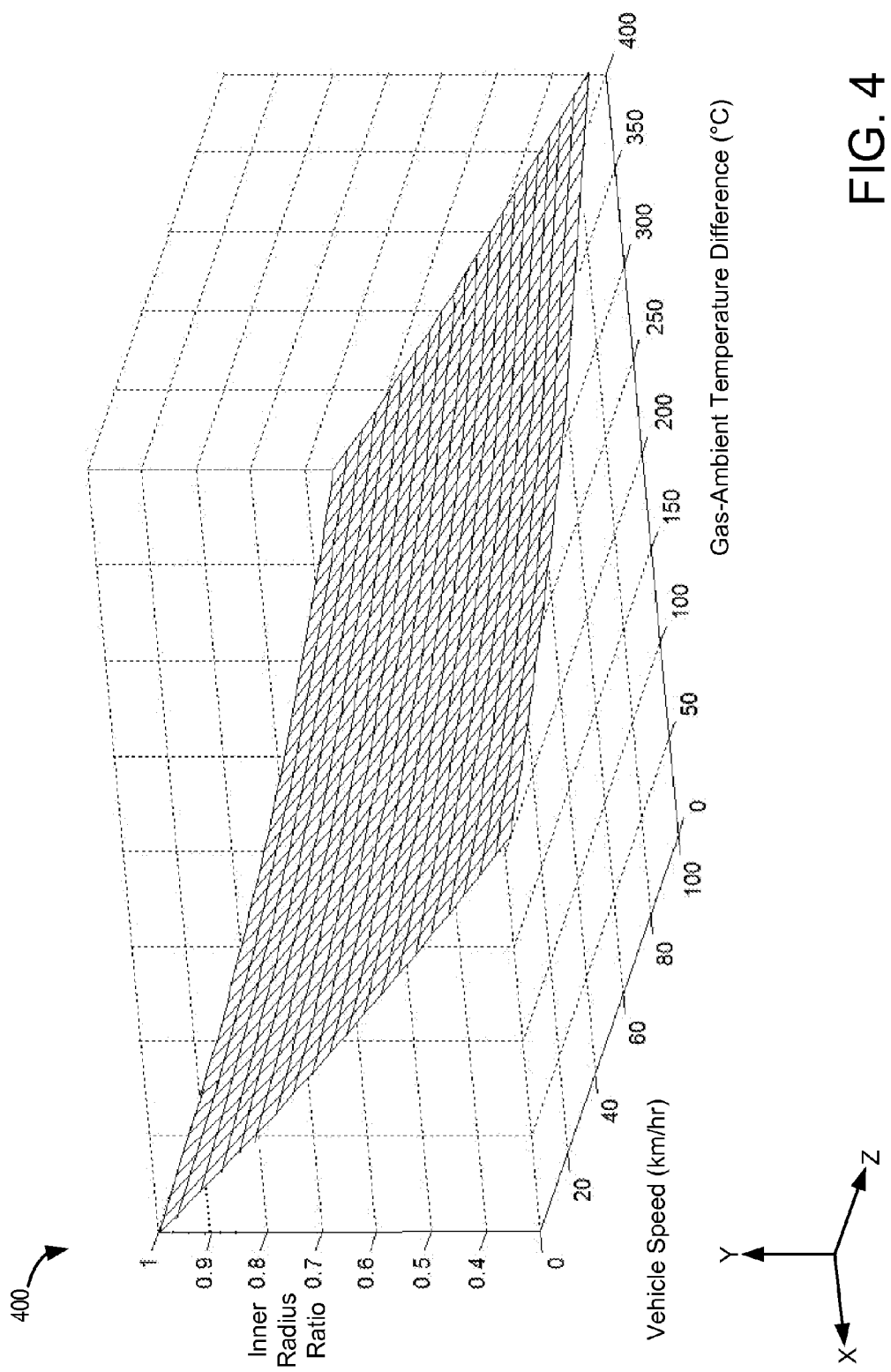
FIG. 4 is a graph relating an inner radius ratio of an SCR catalyst model to vehicle speed and a difference between engine exhaust gas temperature and ambient temperature.

Referring now to FIG. 3A, it relates model 200 of FIGS. 2A-2C to an example four-quadrant axial and radial model 300. In model 300, each of the radial and axial zones of model 200 is represented by one of elements 1-4. Element 1 may represent the intersection (e.g., the common volume) of inner radial zone $N_{r2}$ of model 200 and front axial zone $N_{a1}$ of model 200; element 2 may represent the intersection of inner radial zone $N_{r2}$ and back axial zone $N_{a2}$; element 3 may represent the intersection of outer radial zone $N_{r1}$ and front axial zone $N_{a1}$; and element 4 may represent the intersection of outer radial zone $N_{r1}$ and back axial zone $N_{a2}$. Elements 1-4 each have the same chemical kinetics described by the four main SCR reactions of the SCR catalyst (adsorption, desorption, reduction and oxidation) but are modeled with independent $NH_3$ storage levels and temperatures. The primary model inputs are feedgas $NO_x$ concentration, $C_{NOx}^{in}$, $NH_3$ input concentration, $C_{NH3}^{in}$, exhaust gas temperature, $T_{exh}^{in}$, and exhaust mass flow rate, $\dot{m}_{exh}$. In the present example, all inputs may be assumed to be uniformly distributed at the SCR catalyst front face. In the present example, the input $NO_x$ and $NH_3$ concentrations and exhaust gas temperature are the same for elements 1 and 3, whereas the input exhaust mass flow rate for each of elements 1 and 3 is determined by the inner and outer element area ratio:

$$\dot{m}_{exh}^1 = \frac{A_1}{A_{tot}}\dot{m}_{exh}, \dot{m}_{exh}^3 = \frac{A_3}{A_{tot}}\dot{m}_{exh}$$

In some examples, the uniform $NH_3$ distribution assumption may be relaxed if the $NH_3$ distribution is mapped to a priori experimental data or CFD simulations using known real-time vehicle parameters. This mapping is typically provided as a distribution factor for the particular mixer design of the vehicle system, and varies as a function of exhaust flow rate, urea injection pressure, injection quantity, and ambient temperature.

The output of model 300 may be a single signal representing the concentrations of $NO_x$ and $NH_3$ in the exhaust gas exiting the SCR catalyst, which may be compared to the output of a sensor that measures the exhaust gas composition at a single location downstream of the SCR catalyst. The outputs of the elements may be assumed to have mixed together at this location. The sensed concentration $C_{NOx}^{out}$ may be described in terms of the area ratios as follows:

$$C_{NOx}^{out} = \frac{A_1}{A_{tot}}C_{NOx}^{out,2} + \frac{A_3}{A_{tot}}C_{NOx}^{out,4}, C_{NH3}^{out} = \frac{A_1}{A_{tot}}C_{NH3}^{out,2} + \frac{A_3}{A_{tot}}C_{NH3}^{out,4}$$

When modeling a single brick system (e.g., a system with a unitary, monolithic SCR catalyst), the outputs from elements 1 and 3 are specified to be the inputs to the downstream elements 2 and 4, respectively. Alternatively, when modeling an SCR catalyst which is split into multiple devices separated by a pipe, the exhaust gas downstream of the upstream elements (e.g., elements 1 and 3) can mix before entering the downstream elements (e.g., elements 2 and 4). In such an example, the inputs to the downstream elements may be assumed to be uniformly distributed and can be calculated using the equations above.

Figure 3B:
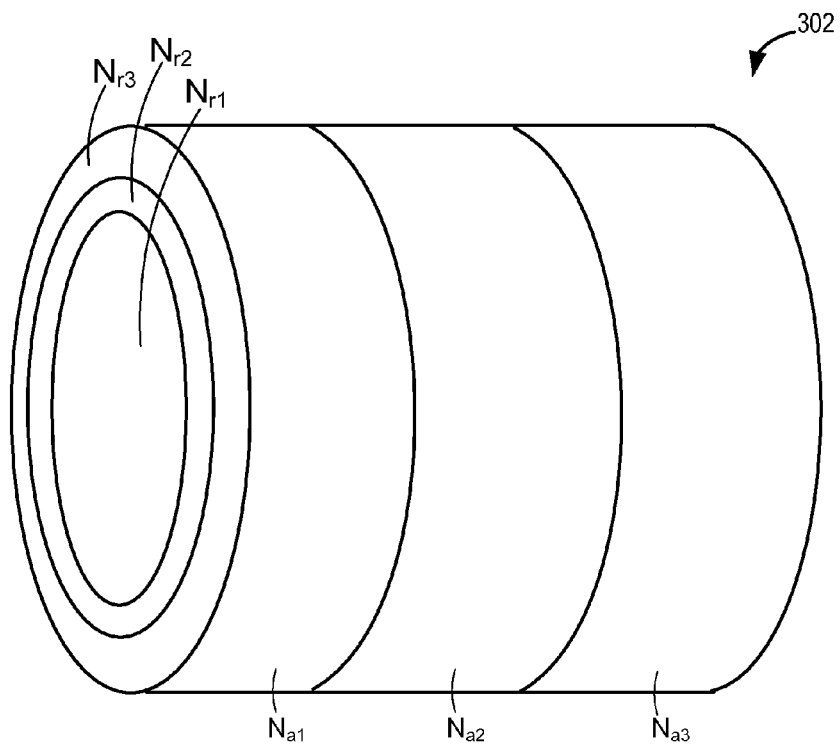

FIG. 3B shows another example embodiment of a modeled axial and radial distribution of reductant in an SCR catalyst with a plurality of modeled axial and radial zones. Model 302 of FIG. 3B is similar to model 200, except that it includes exactly three radial zones ($N_{r1}$, $N_{r2}$, $N_{r3}$) and exactly three axial zones ($N_{a1}$, $N_{a2}$, $N_{a3}$). While larger numbers of zones can more accurately capture sharp temperature or reductant storage gradients, they may increase the computational load of the microprocessor unit.

It will be appreciated that FIGS. 1, 2A-2C, and 3A-3B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example.

FIG. 4 shows a graph 400 which depicts how vehicle speed, exhaust gas temperature, and ambient temperature may affect the ratio of the radius of an inner radial zone of a modeled SCR catalyst (e.g., radius $R_{in}$) to the radius of the modeled SCR catalyst (e.g., radius $R_{out}$). In graph 400, the ratio of the radii is depicted along the Y axis, vehicle speed in kilometers per hour is depicted along the Z axis, and the difference between exhaust gas temperature and ambient temperature in degrees Celsius is depicted along the X axis.

As shown in graph 400, assuming that the values of all other parameters remain constant, the ratio of the radius of the modeled inner radial zone to the radius of the modeled SCR catalyst may decrease as a difference between exhaust gas temperature ($T_{gas,in}$) and ambient temperature ($T_{amb}$) (e.g., the projected heat loss of the SCR catalyst to its surroundings) increases. For example, the ratio may be inversely proportional to the difference between $T_{gas,in}$ and $T_{amb}$. The ratio may further decrease with increasing vehicle speed ($V_{ss}$) (e.g., such that the ratio is inversely proportional to vehicle speed). In one example, the ratio of $R_{in}$ to $R_{out}$ may be determined by the equation below:

$$\frac{R_{in}}{R_{out}} = ke^{\frac{-c1*(T_{gas,in}-T_{amb})}{\Delta T_{ref}}} e^{\frac{-c2*V_{ss}}{V_{ss,ref}}}$$

In the model, the relationship between $R_{in}$, $R_{out}$, and a predefined minimum value of $R_{in,min}$ may be represented as follows:

$$R_{in,min} \leq R \leq R_{out}$$

Figure 5A:
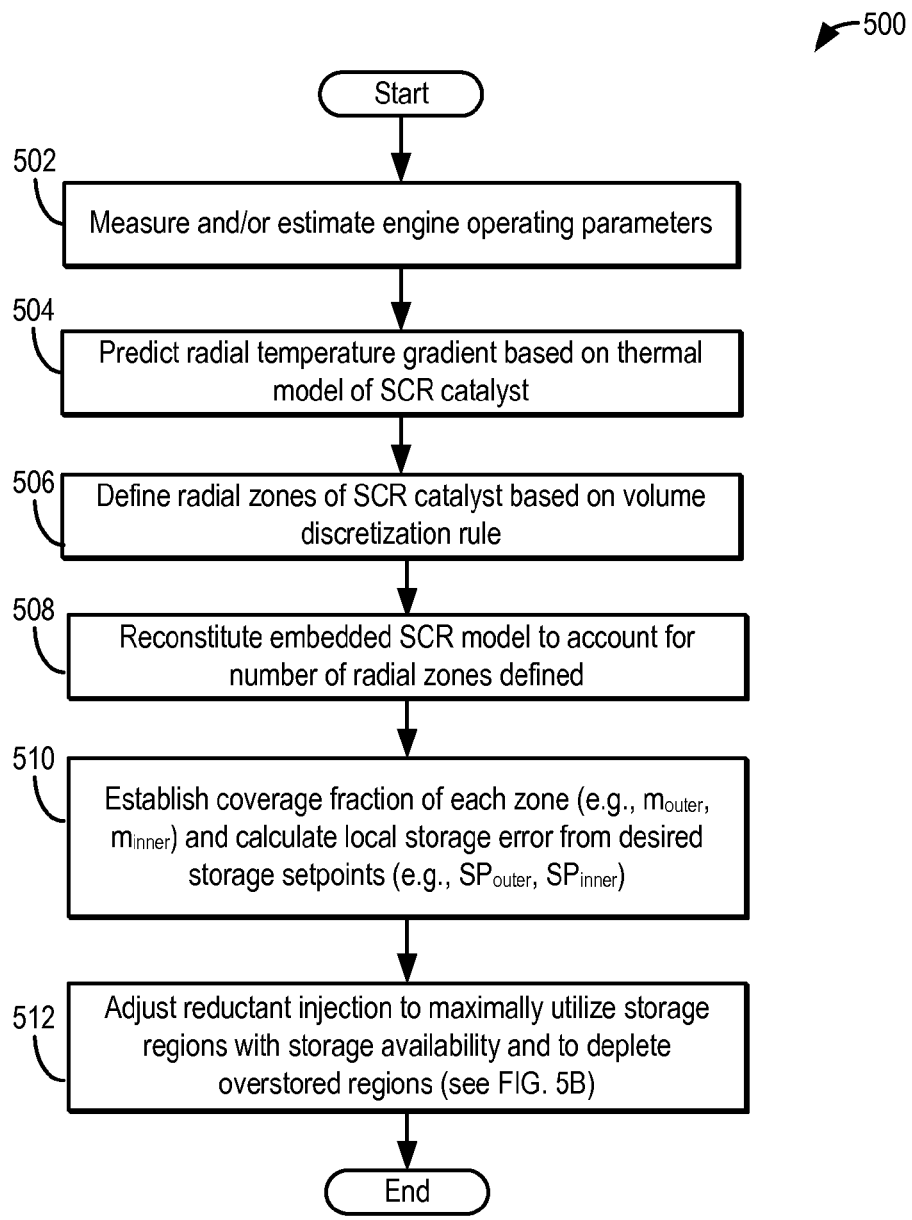
FIGS. 5A-5B are flow charts depicting methods for adjusting radial reductant distribution in an SCR catalyst.

Proceeding to FIG. 5A, it shows a flow diagram of a method 500 for adjusting reductant injection based on a model of an expected distribution of stored reductant among a plurality of radial zones of an SCR catalyst arranged in an engine exhaust passage, such as SCR catalyst 152 of FIG. 1. Instructions for carrying out method 500 and the rest of the methods included herein may be executed by a controller (e.g., controller 12 of FIG. 1) based on instructions stored in memory of the controller, and in conjunction with signals received from sensors of the vehicle system, such as the sensors described above with reference to FIG. 1. The controller may employ actuators of the vehicle system to adjust operation of the vehicle system according to the methods described below.

At 502, method 500 includes measuring and/or estimating vehicle operating parameters. In one non-limiting example, the operating parameters may include ambient temperature, the temperature of the exhaust gas entering the SCR catalyst, the temperature of the exhaust gas leaving the SCR catalyst, vehicle speed, and the flow rate of exhaust gas entering the SCR catalyst.

At 504, method 500 includes predicting a radial temperature gradient of the SCR catalyst based on a thermal model. For example, the operating parameters measured and/or estimated at 502 may be used as inputs to a thermal model which models local temperatures within the SCR catalyst, where the thermal model includes a radial temperature gradient representing temperature variations in the SCR catalyst as a function of radial distance from a central longitudinal axis of the SCR catalyst. Additionally or alternatively, the radial temperature gradient may be determined based on ambient temperature and/or a projected heat loss of the SCR catalyst to its surroundings.

At 506, method 500 includes defining a plurality of radial zones of the modeled SCR catalyst based on an SCR volume discretization rule. For example, the volume discretization rule may be a thermal volume discretization rule that defines a volume ratio of modeled inner and outer radial zones of the SCR catalyst. For example, a cooler outer region may expand and contract with colder and warmer ambient temperatures, and thus a radius of an inner radial zone, such as radius $R_{in}$, of inner radial zone $N_{r2}$, may be modeled as contracting and expanding in real time, e.g. as a function of ambient temperature, vehicle speed, and feedgas temperature. In this way, the relative volumes of the modeled radial zones may be adjusted continuously over time. In an alternative example, however, the volumes of the modeled radial zones may be adjusted when the ambient temperature crosses discrete temperature thresholds. By defining radially inner and radially outer zones in a model of an SCR catalyst, and then adjusting the radii defining the zones to achieve a desired volume ratio between the zones, real-time values of vehicle operating parameters may factor into the modeling of local temperatures within the SCR catalyst, which may advantageously increase the accuracy of the model.

At 508, method 500 includes reconstituting (e.g., adjusting) the embedded model of the SCR catalyst to account for the radial zones defined at 506. This may involve redistributing the storage into the various radial discretized storage elements. As described herein, a vehicle controller may include an embedded model of the SCR catalyst of the vehicle system, e.g., which is stored in memory of the controller during manufacture of the vehicle. The embedded model may be based on data regarding the characteristics of the particular SCR catalyst which is included in the vehicle system (e.g., the physical structure/dimensions of the SCR catalyst and the various materials and washcoats which form the SCR catalyst). The embedded model may be modified at 508 to reflect the radial zones defined based on the thermal model. In other examples, however, a separate model may be stored in memory which includes the radial zones defined at 506, and the controller may generate the separate model based on data from the embedded model.

At 510, the method may establish a coverage fraction of each of the defined radial zones and calculate local storage errors from desired storage setpoints. As used herein, the coverage fraction is the ratio of the actual storage to the total storage possible on the catalyst zone in consideration at the given operating condition. Coverage fractions may be established by modeling reductant storage in the SCR catalyst via a kinetic model (e.g., a model which accounts for adsorption, desorption, oxidation, and reduction of $NO_x$ by a reductant) using locally-estimated SCR catalyst substrate temperatures (e.g., based on the thermal model of the SCR catalyst). For example, the kinetic model may include the reaction rates of the reduction of $NO_x$ by the reductant (e.g., ammonia), and the reaction rate of the parallel oxidation of the reductant. Other inputs for the kinetic model may include $NO_x$ and $NH_3$ concentrations of the exhaust gas entering the SCR catalyst, local exhaust gas mass flow rates within the SCR catalyst, etc. The locally-modeled reductant storage levels may then be compared to corresponding desired local storage setpoints to determine local storage errors. For example, a local storage error may be equal to the difference between a modeled reductant storage level in a particular radial zone and a reductant storage setpoint for that zone. Herein, the coverage fraction of the inner radial zone in a model having exactly two radial zones is referred to as $m_{inner}$, whereas the coverage fraction of the outer radial zone in a model having exactly two radial zones is referred to as $m_{outer}$. Further, herein, the local reductant storage setpoint for the inner radial zone in a model having exactly two radial zones is referred to as $SP_{inner}$, whereas the local reductant storage setpoint for the outer radial zone in a model having exactly two radial zones is referred to as $SP_{outer}$.

Figure 5B:
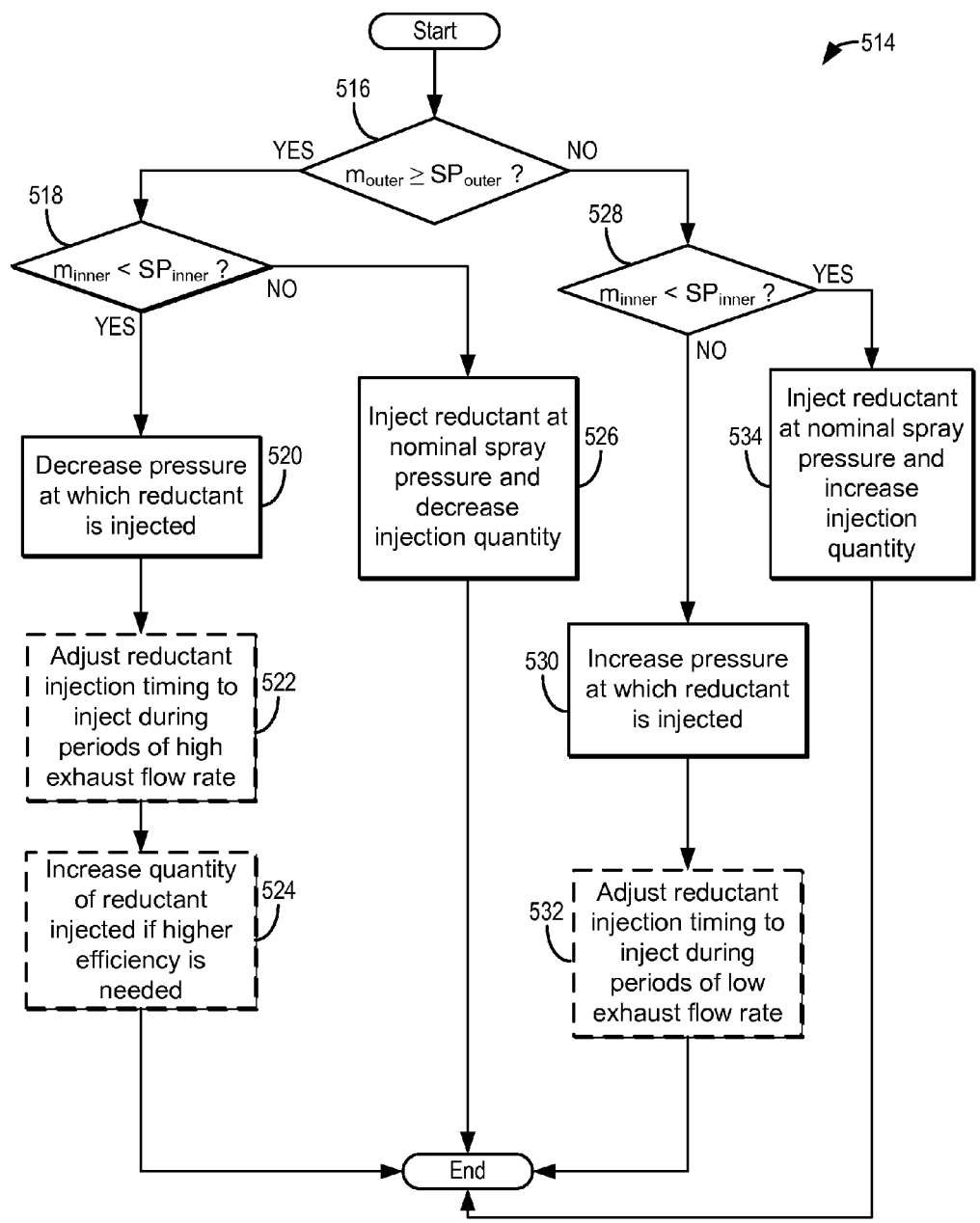

At 512, method 500 includes adjusting reductant injection to maximally utilize storage regions with storage availability and to deplete overstored regions, for example in the manner set forth in method 514 of FIG. 5B in examples where the model is divided into exactly two radial zones. As described below with reference to FIG. 5B, adjusting reductant injection may include adjusting injection pressure, injection quantity, and/or injection timing. The adjustments may be based on comparisons of a modeled amount of reductant stored in a given radial zone (e.g., an inner radial zone or an outer radial zone in a model having exactly two radial zones) with a corresponding storage setpoint for that zone. The table below depicts different example adjustments to reductant injection corresponding to the results of such comparisons.

| Radial storage distribution | Reductant injection spray adjustment |
|---|---|
| ($m_{outer}$ >= $SP_{outer}$) & ($m_{inner}$ < $SP_{inner}$) | Adjust (lower) reductant injection pressure to impact spray pattern to achieve higher concentration in the center. If possible inject during periods of high exhaust flow rate. May also adjust urea quantity to provide more urea to the central core if higher efficiency is needed. |
| ($m_{outer}$ < $SP_{outer}$) & ($m_{inner}$ >= $SP_{inner}$) | Adjust (increase) reductant injection pressure and, if possible, inject at low exhaust flow rate to impact spray pattern to achieve higher concentration at outer core. |
| ($m_{outer}$ < $SP_{outer}$) & ($m_{inner}$ < $SP_{inner}$) | Nominal spray pressures for uniform distribution but may increase injection quantity to increase efficiency if so desired. |
| ($m_{outer}$ >= $SP_{outer}$) & ($m_{inner}$ >= $SP_{inner}$) | Nominal spray pressures for uniform distribution but may need to reduce injection quantity to manage $NH_3$ slip. |

After 512, method 500 ends.

Referring now to FIG. 5B, it shows a flow diagram of a method 514 for adjusting reductant injection to maximally utilize storage regions with storage availability and to deplete overstored regions of the SCR catalyst, which corresponds to the reductant injection control strategy outlined in the table above. As noted above, method 514 may be performed in conjunction with method 500 at 512, and is specifically tailored to an example in which the model includes exactly two radial zones. However, it will be appreciated that similar methods may be performed for models having a greater number of radial zones, based on similar principles.

At 516, method 514 includes determining whether the coverage fraction of the outer radial zone in a model having exactly two radial zones ($m_{outer}$) is greater than or equal to the local reductant storage setpoint ($SP_{outer}$) for the outer radial zone. In one example, the determination may be made at the controller via a comparison of the two quantities.

If the answer at 516 is YES, method 514 proceeds to 518 to determine whether the coverage fraction of the inner radial zone in a model having exactly two radial zones ($m_{inner}$) is less than the local reductant storage setpoint ($SP_{inner}$) for the inner radial zone. In one example, the determination may be made at the vehicle controller via a comparison of the two quantities. If the answer at 518 is YES, method 514 proceeds to 520.

At 520, the method includes decreasing the pressure at which reductant (e.g., urea) is injected into the SCR catalyst. For example, the controller may send a signal to an actuator of the reductant dosing system which effects a decrease in the injection pressure of the reductant injector. After 520, the method either ends, or optionally proceeds to 522

At 522, the method includes adjusting reductant injection timing to inject reductant during periods of high exhaust flow rate. For example, the controller may receive signals from sensors of the exhaust system indicating the current exhaust flow rate, and may send signals to an actuator of the reductant injector to start injection of reductant when the exhaust flow rate is above a threshold and to stop the injection of reductant when the exhaust flow rate falls below the threshold. After 522, method 514 either ends, or optionally proceeds to 524.

At 524, method 514 includes increasing the quantity of reductant injected if higher efficiency is needed. For example, the controller may determine a current $NO_x$ reduction efficiency of the SCR catalyst, e.g. based on signals from various sensors of the vehicle system. If it is determined that the current $NO_x$ reduction efficiency is below a desired level of efficiency, the controller may send a signal to an actuator of the reductant injector to increase the quantity of reductant injected upstream of the SCR catalyst. After 524, method 514 ends.

Returning to 518, if the answer is NO, the method proceeds to 526 to inject reductant at a nominal spray pressure and decrease reductant injection quantity. The nominal spray pressure may be a default pressure used for reductant injection in the vehicle system, which is defined for optimal spray distribution providing maximally uniform radial distribution of the reductant. After 526, method 514 ends.

Returning to 516, if the answer is NO, the method proceeds to 528 to determine whether $m_{inner}$ is less than $SP_{inner}$, for example in the manner described above for 518. If the answer at 528 is NO, method 514 proceeds to 530.

At 530, method 514 includes increasing the pressure at which reductant is injected upstream of the SCR catalyst. For example, the controller may send a signal to an actuator of the reductant dosing system which effects an increase in the injection pressure of the reductant injector.

After 530, method 514 either ends or optionally proceeds to 532 to adjust reductant injection timing to inject reductant during periods of low exhaust flow rate. For example, the controller may receive signals from sensors of the exhaust system indicating the current exhaust flow rate, and may send signals to an actuator of the reductant injector to start injection of reductant when the exhaust flow rate is below a threshold and to stop the injection of reductant when the exhaust flow rate exceeds the threshold. After 532, method 514 ends.

Returning to 528, if the answer is YES, the method includes injecting reductant at a nominal spray pressure and increasing reductant injection quantity. As noted above, the nominal spray pressure may be a default pressure used for reductant injection in the vehicle system, which is defined for optimal spray distribution providing maximally uniform radial distribution of the reductant. After 534, method 514 ends.

In accordance with method 514, various reductant injection strategies may be employed to achieve desired results. The technical effect of adjusting reductant injection in this way is that the distribution of reductant at the front face of the SCR catalyst is a function of reductant dosing pressure and exhaust flow rate, and is specific for a given mixer design and injector location. In this way, the dosing pressure of reductant can be actively controlled, and dosing can be timed to correspond to high or low exhaust flow rates to change the radial distribution of reductant entering the catalyst.

Therefore, a method for a vehicle emission controls system in accordance with the present disclosure may comprise decreasing reductant injection pressure if an amount of reductant stored in the outer radial zone is greater than or equal to the reductant storage setpoint of the outer radial zone and an amount of reductant stored in the inner radial zone is less than the reductant storage setpoint of the inner radial zone. Decreasing reductant injection pressure may advantageously result in a higher concentration of reductant stored in the radially central portion of the SCR catalyst, thereby increasing $m_{inner}$. Thus, adjusting reductant injection pressure may provide control over the radial distribution of reductant stored in the SCR catalyst.

The method may further comprise adjusting reductant injection timing to occur while a flow rate of exhaust gases entering the SCR catalyst rate is above a threshold if the amount of reductant stored in the outer radial zone is greater than or equal to the reductant storage setpoint of the outer radial zone and the amount of reductant stored in the inner radial zone is less than the reductant storage setpoint of the inner radial zone. Adjusting reductant injection timing in this way may also provide control over the spray pattern of reductant such that a desired radial distribution of stored reductant (in this case, a higher concentration of reductant stored in the central core of the SCR catalyst) is achieved.

Furthermore, the method may include increasing a quantity of reductant injected if the amount of reductant stored in the outer radial zone is greater than or equal to the reductant storage setpoint of the outer radial zone and the amount of reductant stored in the inner radial zone is less than the reductant storage setpoint of the inner radial zone. Increasing the quantity of reductant injected during these conditions may advantageously increase $NO_x$ reduction efficiency.

In contrast, the method may maintain reductant injection pressure at a nominal level and decrease a quantity of reductant injected if the amount of reductant stored in the outer radial zone is greater than or equal to the reductant storage setpoint of the outer radial zone and the amount of reductant stored in the inner radial zone is greater than or equal to the reductant storage setpoint of the inner radial zone. Doing so may advantageously ensure uniform radial distribution of reductant while managing reductant (e.g., $NH_3$) slip which may otherwise occur, during conditions where more reductant is stored in the SCR catalyst than desired.

In accordance with method 514, a method for a vehicle emission controls system may further comprise maintaining reductant injection pressure at the nominal level and increasing the quantity of reductant injected if the amount of reductant stored in the outer radial zone is less than the reductant storage setpoint of the outer radial zone and the amount of reductant stored in the inner radial zone is less than the reductant storage setpoint of the inner radial zone. Doing so may advantageously ensure uniform radial distribution of reductant while increasing $NO_x$ reduction efficiency.

In contrast, if the amount of reductant stored in the outer radial zone is less than the reductant storage setpoint of the outer radial zone and the amount of reductant stored in the inner radial zone is greater than or equal to the reductant storage setpoint of the inner radial zone, the method may include increasing reductant injection pressure, and optionally adjusting reductant injection timing to occur when a flow rate of exhaust gases entering the SCR catalyst is below a threshold. Such operation may achieve a higher concentration of reductant stored at the periphery (e.g., the radially outer region) of the SCR catalyst.

Turning now to FIG. 6, it shows a flow diagram of a method 600 for adjusting an axial storage location of reductant in an SCR catalyst based on a predicted axial temperature gradient. A vehicle controller, such as controller 12 of FIG. 1, may include a processor and a non-transitory, computer-readable medium storing instructions executable by the processor to communicate with various sensors and control various actuators of the vehicle system to perform method 600. Further, method 600 may be performed in combination with method 500, e.g., simultaneously or sequentially.

Method 600 comprises, at 602, measuring and/or estimating vehicle operating parameters, for example in the manner described above for step 502 of method 500.

At 604, the method may predict an axial temperature gradient of the SCR catalyst based on a thermal model of the SCR catalyst. For example, the operating parameters measured and/or estimated at 602 may be used as inputs to a thermal model which models local temperatures within the SCR catalyst, where the thermal model includes an axial temperature gradient representing temperature variations in the SCR catalyst over an axial length of the SCR catalyst. Additionally or alternatively, the axial temperature gradient may be determined based on ambient temperature and/or a projected heat loss of the SCR catalyst to its surroundings.

At 605, method 600 includes defining axial zones of the SCR catalyst, for example in a similar manner to the actions described above for step 506 of method 500.

At 606, the method may establish a coverage fraction of each of the defined axial zones and calculate local storage errors from desired storage setpoints. For example, the method may compare the distribution at each axial zone based on the axial temperature gradient predicted at 604 to a reductant storage setpoint at each zone, thus calculating a local storage error. Further, a kinetic model may be used to establish local reductant storage, e.g., the model of axial temperature distribution in the SCR catalyst may be used as an input for the kinetic model, thereby establishing a model of axial reductant storage distribution, which may be compared to a local reductant storage setpoints to determine local storage errors.

At 608, method 600 includes determining whether the distribution of stored reductant is skewed towards the front or the back of the SCR catalyst beyond limits. For example, the determination may be performed by a controller of the vehicle based on the local storage errors calculated at 606. The limits for front and back skewing of stored reductant may be predetermined limits stored in memory of the controller. For example, the distribution of stored reductant may be skewed towards the front beyond a limit if a local storage error for a front axial zone of the SCR catalyst is greater than a threshold, while a local storage error for a back axial zone of the SCR catalyst is not greater than a threshold. As another example, the distribution of stored reductant may be skewed towards the back beyond a limit if a local storage error for a back axial zone of the SCR catalyst is greater than a threshold, while a local storage error for a front axial zone of the SCR catalyst is not greater than a threshold. However, other methods for performing the determination may be performed without departing from the scope of this disclosure.

If the answer at 608 is NO, method 600 ends. Otherwise, if the answer at 608 is YES, method 600 proceeds to 609. If the distribution is front-skewed, method 600 proceeds from 609 to 610.

At 610, the method includes determining whether a temperature perturbation entry condition is present. For example, the temperature perturbation entry condition may be present if current vehicle operating conditions allow for adjustments to exhaust temperature without compromising vehicle operation, which may be determined based on vehicle operating parameters such as those measured and/or estimated at 602.

If it is determined at 610 that the temperature perturbation entry condition is not present, method 600 ends. Otherwise, the method proceeds to 612 to temporarily increase the temperature of exhaust gas entering the SCR catalyst (e.g., the feedgas temperature) to decrease the amount of reductant stored at the upstream side of the SCR catalyst by slipping reductant to the middle or the downstream side of the SCR catalyst. For example, the method may adjust an axial reductant storage location from the front to the back of the catalyst by adjusting the temperature of the exhaust gas entering the SCR catalyst. In one example, adjusting the temperature of the exhaust gas may include actively increasing the temperature by adjusting engine operating conditions/parameters and/or by activating a glow plug or burner arranged in the emission control system upstream of the SCR catalyst. After 612, method 600 ends.

Returning to 609, if the reductant storage distribution is back-skewed, the method proceeds to 614 to determine whether a feedgas $NO_x$ perturbation entry condition is present. For example, the temperature perturbation entry condition may be present if current vehicle operating conditions allow for adjustments to exhaust $NO_x$ concentration without compromising vehicle operation, which may be determined based on vehicle operating parameters such as those measured and/or estimated at 602. If the answer at 614 is NO, method 600 ends.

Otherwise, if the answer at 614 is YES, method 600 proceeds to 616 to temporarily increase feedgas $NO_x$ concentration, to accelerate depletion of reductant stored at the downstream side of the SCR catalyst (e.g., in a back axial zone of the SCR catalyst). In one example, the method may include actively increasing the concentration of $NO_x$ in the exhaust gas entering the SCR catalyst by retarding spark timing, decreasing engine air-fuel ratio, and/or decreasing an EGR rate. However, alternative means of actively increasing the feedgas $NO_x$ concentration are also contemplated.

After 616, method 600 proceeds to 618. At 618, the method includes increasing reductant dosing to replenish reductant consumed at the upstream side of the SCR catalyst. For example, the controller may send a signal to an actuator of the reductant injector to increase the quantity of reductant injected into the SCR catalyst. After 618, the method ends.

When methods 500, 514, and 600 are used together, an expected distribution of stored reductant may be modeled among a plurality of axial zones and a plurality of radial zones of an SCR catalyst arranged in an engine exhaust passage. A vehicle controller may then compare the expected distribution with a reductant storage setpoint of each zone, and based on the comparison, adjust a radial storage location of reductant by adjusting a spray pattern of reductant injected upstream of the SCR catalyst and further adjust an axial storage location of reductant by adjusting temperature and $NO_x$ concentration of exhaust gas entering SCR catalyst. In one non-limiting example, the model of the distribution of stored reductant stored among the zones may be based on one or more of a thermal model of the SCR catalyst stored in non-transitory memory of the controller, ambient temperature, and projected heat loss of the SCR catalyst to its surroundings. Further, adjusting the spray pattern of reductant injected upstream of the SCR catalyst may comprise adjusting one or more of injection pressure, injection quantity, and injection timing.

Further, when methods 500, 514, and 600 are used together, an estimated spatial distribution of reductant stored in an SCR catalyst may be compared with a desired spatial distribution of reductant stored in the catalyst. Based on the comparison, if radial adjustment of the spatial distribution is desired, a pressure at which reductant is injected into the SCR catalyst may be adjusted, whereas if axial adjustment of the spatial distribution is desired, exhaust gas temperature and/or $NO_x$ concentration may be adjusted. In addition, if axial adjustment of the spatial distribution is desired, a determination may be made (e.g., at the controller) as to whether the spatial distribution is skewed towards an upstream side or a downstream side of the SCR catalyst with respect to the direction of exhaust gas flow. If the spatial distribution is skewed towards the upstream side of the SCR catalyst, a temperature of the exhaust gas entering the SCR catalyst may be actively increased, whereas if the spatial distribution is skewed towards the downstream side of the SCR catalyst, a concentration of $NO_x$ in the exhaust gas entering the SCR catalyst may be actively increased. In some examples, actively increasing the temperature of the exhaust gas entering the SCR catalyst may comprise adjusting engine operating conditions and/or activating a glow plug or burner arranged in the emission control system upstream of the SCR catalyst. Further, in some examples, actively increasing the concentration of $NO_x$ in exhaust gas entering the SCR catalyst may comprise one or more of retarding spark timing, decreasing engine air-fuel ratio, and decreasing an exhaust gas recirculation rate. Furthermore, an amount of reductant injected into the SCR catalyst may be increased for a duration after adjusting the $NO_x$ concentration, which may advantageously increase the efficiency of the SCR catalyst.

In one disclosed embodiment, a vehicle system, such as the vehicle system shown in FIG. 1, may comprise an SCR catalyst arranged in an engine exhaust passage downstream of a reductant injector. The vehicle system may further comprise a controller comprising a processor and a non-transitory, computer-readable medium storing instructions executable by the processor to divide an embedded virtual model of an SCR catalyst stored in non-transitory memory of the controller into a plurality of radial zones, and determine a reductant storage setpoint for each zone based on a volume and estimated temperature of the zone. The controller may further comprise instructions stored in the medium which are executable by the processor to adjust a radial distribution of reductant in the SCR catalyst, based on a comparison of a current level of reductant stored in each zone with the reductant storage setpoint for that zone, by adjusting a spray pattern of reductant injected upstream of the SCR catalyst. In one non-limiting example, adjusting the spray pattern of reductant injected upstream of the SCR catalyst comprises adjusting one or more of reductant injection pressure, reductant injection quantity, and reductant injection timing. The controller may further comprise instructions stored in the medium which are executable by the processor to further divide the embedded virtual model of the SCR catalyst into a plurality of axial zones, determine a reductant storage setpoint for each axial zone based on a volume and estimated temperature of the zone, and adjust an axial distribution of reductant in the SCR catalyst, based on a comparison of a current level of reductant stored in each axial zone with the reductant storage setpoint for that zone, by adjusting temperature of exhaust gas entering the SCR catalyst and/or adjusting a concentration of $NO_x$ in the exhaust gas entering SCR catalyst. The estimated temperature of each radial and axial zone may be determined based on one or more of a thermal model stored in the memory, an ambient temperature, and a projected heat loss of the SCR catalyst to its surroundings. Further, dividing the virtual model of the SCR catalyst into a plurality of radial zones may comprise dividing the virtual model of the SCR catalyst into an inner radial zone and at least one outer radial zone. In some examples, a radius of a cross-section of the inner radial zone and a radial thickness of each outer radial zone is defined based on one or more of a thermal model of the SCR catalyst stored in the computer-readable medium, an ambient temperature, and a projected heat loss of the SCR catalyst to its surroundings. Further, there may be exactly one outer radial zone in the virtual model of the SCR catalyst, wherein the inner radial zone is modeled as a cylinder, and wherein the outer radial zone is modeled as a hollow cylinder, and wherein an inner circumference of the outer radial zone is coextensive with a circumference of the inner radial zone and forms a boundary between the inner and outer radial zones in the model.

Turning now to FIG. 7, it shows graphical data of measured SCR catalyst substrate temperatures (in degrees Celsius) in the axial and radial dimensions over time (in seconds). The data shown in FIG. 7 is experimental data from a thermocoupled 9.89 L catalyst during bags 1 and 2 of an FTP-75 drive cycle, with the thermocouples placed near the front and back faces of the catalyst as well as in the center and at various radial locations.

Graph 720 of FIG. 7 depicts measured temperature gradients of the SCR catalyst over time at various axial positions of the SCR catalyst. In graph 720, characteristic 702 depicts the temperature at the front of the SCR catalyst, e.g., front face 214, characteristic 704 depicts the temperature at the middle of the length of the SCR catalyst, and characteristic 706 depicts the temperature at the back of the SCR catalyst, e.g., end face 216.

Graph 722 of FIG. 7 depicts measured temperature gradients at various radial positions of the front face of the SCR catalyst in over time. For example, characteristic 708 depicts the temperature at the center of the front face, characteristic 710 depicts the temperature 1 inch radially inward from the periphery of the SCR catalyst at the front face, and characteristic 712 depicts the temperature ⅛ inch radially inward from the periphery of the SCR catalyst at the front face. As may be seen in graph 722, characteristics 708 and 710 are substantially the same during the time period illustrated and thus overlap one another such that only two characteristics total are visible in the graph.

Graph 724 of FIG. 7 depicts measured temperature gradients at various radial positions of the back face of the SCR catalyst over time. For example, characteristic 714 depicts the temperature at the center of the back face, characteristic 716 depicts the temperature 1 inch inward from the periphery of the SCR catalyst at the back face, and characteristic 716 depicts the temperature ⅛ inch radially inward from the periphery of the SCR catalyst at the back face of the SCR catalyst. As may be seen in graph 724, characteristics 714 and 716 are substantially the same during the time period illustrated and thus overlap one another such that only two characteristics total are visible in the graph.

As may be seen in graphs 720, 722, and 724, although the radial temperature gradient is negligible across most of the catalyst, the temperature drops significantly near the edge. While the radial distance of the portion of the SCR catalyst with a larger radial temperature gradient (e.g., a temperature drop) is relatively short, this cooler region, e.g., outer radial region $N_{r1}$, accounts for over 25% of the volume of the SCR catalyst. Further, as the radial gradient is persistent throughout the drive cycle, the mean radial gradient is larger than the axial gradient. Furthermore, because the SCR catalyst typically stores most of the reductant near the front (e.g., near the front face of the SCR catalyst), the axial gradient is small over a short distance but the radial gradient at the front is still significant. The table below includes experimental measurements of mean and maximum temperature differences across an SCR catalyst.

| Measured Temperature Gradient | | |
| --- | --- | --- |
| Direction | Mean Difference (° C.) | Max Difference (° C.) |
| Axial | 5.6 | 103.8 |
| Radial - Front | 13.7 | 32.5 |
| Radial - Back | 29.2 | 66.3 |

The inventors herein have recognized that a distributed model may capture catalyst dynamics caused by non-uniform radial or radial and axial reductant storage and temperature profiles. Holding reductant storage constant, lower temperatures near the edge of the catalyst reduce local $NO_x$ efficiency and reductant slip. This in turn increases reductant storage in the outer region compared to the inner region. The reductant storage difference can grow in time and drive overall system dynamics that are not reproducible without modeling the two different radial regions. The reductant storage location within the catalyst and local temperature profile are strongly coupled.

FIG. 8 provides a graphical depiction of experimental results which compare $NH_3$ storage, tailpipe $NO_x$ concentration, and $NH_3$ slip predictions of a radial and axial distributed model to an axial-only model. The axial-only model substrate temperature at each axial location is defined as a weighted average of the inner and outer substrate temperatures from the four-quadrant model.

Graph 820, which depicts $NH_3$ storage in grams per liter over time in seconds, shows that the outer elements have a much higher storage density, which is nearly double that of the inner elements in the axial and radial model. Characteristic 802 represents an outer zone of a radial and axial model of the SCR catalyst, characteristic 804 represents the entire SCR catalyst in accordance with the an axial and radial model, characteristic 806 represents the entire SCR catalyst in accordance with the axial-only model, and characteristic 808 represents the inner zone of the radial and axial model of the SCR catalyst. As shown, the storage density of the entire (total) SCR catalyst is relatively close to the storage density of the inner zone, because the inner zones are defined to encompass 75% of the total volume of the catalyst. In this example, the differences between the two models may have little effect on $NO_x$ slip, as can be seen in graph 822 which focuses on the last cycle in the simulation.

In graph 822, which depicts $NO_x$ slip in parts per million over time in seconds, characteristic 810 represents the $NO_x$ concentration of exhaust gas entering the SCR catalyst, characteristic 812 represents the amount of $NO_x$ slip in the axial and radial model, and characteristic 814 represents the amount of $NO_x$ slip in the axial-only model.

Graph 824 depicts $NH_3$ slip in parts per million over time in seconds. As shown, there is a large difference in the predicted $NH_3$ slip for the various models. In graph 824, characteristic 816 represents the axial and radial model, and characteristic 818 represents the axial-only model. The axial and radial model predicts a much earlier starting time for $NH_3$ slip, because the outer elements have such high storage compared to the axial-only elements. This earlier indication of $NH_3$ slip may be crucial for SCR control, because the $NH_3$ input should be reduced at the first sign of $NH_3$ breakthrough to prevent substantial quantities of $NH_3$ slip.

Note that the example control and estimation routines included herein can be used with various engine and/or vehicle system configurations. The control methods and routines disclosed herein may be stored as executable instructions in non-transitory memory and may be carried out by the controller including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the controller, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle exhaust emission control system, comprising:
   an SCR catalyst arranged in an engine exhaust passage downstream of a reductant injector;
   a controller comprising a processor and a non-transitory, computer-readable medium storing instructions executable by the processor to:
      divide an embedded virtual model of an SCR catalyst stored in non-transitory memory of the controller into a plurality of radial zones;
      determine a reductant storage setpoint for each zone based on a volume and estimated temperature of the zone; and
      adjust a radial distribution of reductant in the SCR catalyst, based on a comparison of a current level of reductant stored in each zone with the reductant storage setpoint for that zone, by adjusting a spray pattern of reductant injected upstream of the SCR catalyst.

2. The system of claim 1, wherein adjusting the spray pattern of reductant injected upstream of the SCR catalyst comprises adjusting one or more of reductant injection pressure, reductant injection quantity, and reductant injection timing.

3. The system of claim 1, further comprising instructions stored in the medium which are executable by the processor to:
   further divide the embedded virtual model of the SCR catalyst into a plurality of axial zones;
   determine a reductant storage setpoint for each axial zone based on a volume and estimated temperature of the zone; and
   adjust an axial distribution of reductant in the SCR catalyst, based on a comparison of a current level of reductant stored in each axial zone with the reductant storage setpoint for that zone, by adjusting temperature of exhaust gas entering the SCR catalyst and/or adjusting a concentration of $NO_x$ in the exhaust gas entering SCR catalyst.

4. The system of claim 3, wherein the estimated temperature of each radial and axial zone is determined based on one or more of a thermal model stored in the memory, an ambient temperature, and a projected heat loss of the SCR catalyst to its surroundings.

5. The system of claim 1, wherein dividing the virtual model of the SCR catalyst into a plurality of radial zones comprises dividing the virtual model of the SCR catalyst into an inner radial zone and at least one outer radial zone.

6. The system of claim 5, wherein a radius of a cross-section of the inner radial zone and a radial thickness of each outer radial zone is defined based on one or more of a thermal model of the SCR catalyst stored in the computer-readable medium, an ambient temperature, and a projected heat loss of the SCR catalyst to its surroundings.

7. The system of claim 5, wherein there is exactly one outer radial zone in the virtual model of the SCR catalyst, wherein the inner radial zone is modeled as a cylinder, and wherein the outer radial zone is modeled as a hollow cylinder, and wherein an inner circumference of the outer radial zone is coextensive with a circumference of the inner radial zone and forms a boundary between the inner and outer radial zones in the model.

8. A method for a vehicle engine emission control system, comprising:
   comparing an estimated spatial distribution of reductant stored in an SCR catalyst with a desired spatial distribution of reductant stored in the catalyst;
   if radial adjustment of the spatial distribution is desired, adjusting a pressure at which reductant is injected into the SCR catalyst;
   if axial adjustment of the spatial distribution is desired, adjusting exhaust gas temperature and/or $NO_x$ concentration.

9. The method of claim 8, further comprising, if axial adjustment of the spatial distribution is desired,
   determining whether the spatial distribution is skewed towards an upstream side or a downstream side of the SCR catalyst with respect to the direction of exhaust gas flow;
   if the spatial distribution is skewed towards the upstream side of the SCR catalyst, actively increasing a temperature of the exhaust gas entering the SCR catalyst; and
   if the spatial distribution is skewed towards the downstream side of the SCR catalyst, actively increasing a concentration of $NO_x$ in the exhaust gas entering the SCR catalyst.

10. The method of claim 9, wherein actively increasing the temperature of the exhaust gas entering the SCR catalyst comprises adjusting engine operating conditions and/or activating a glow plug or burner arranged in the emission control system upstream of the SCR catalyst.

11. The method of claim 9, wherein actively increasing the concentration of $NO_x$ in exhaust gas entering the SCR catalyst comprises one or more of retarding spark timing, decreasing engine air-fuel ratio, and decreasing an EGR rate.

12. The method of claim 8, further comprising increasing an amount of reductant injected into the SCR catalyst for a duration after adjusting the $NO_x$ concentration.

13. A method for a vehicle emission control system, comprising:

with a controller, modeling an expected distribution of stored reductant among a plurality of axial zones and a plurality of radial zones of an SCR catalyst arranged in an engine exhaust passage and comparing the expected distribution with a reductant storage setpoint of each zone;
based on the comparison,
adjusting a radial storage location of reductant by adjusting a spray pattern of reductant injected upstream of the SCR catalyst; and
adjusting an axial storage location of reductant by adjusting temperature and $NO_x$ concentration of exhaust gas entering SCR catalyst.

14. The method of claim 13, wherein the model of the distribution of stored reductant stored among the zones is based on one or more of a thermal model of the SCR catalyst stored in non-transitory memory of the controller, ambient temperature, and projected heat loss of the SCR catalyst to its surroundings.

15. The method of claim 13, wherein adjusting the spray pattern of reductant injected upstream of the SCR catalyst comprises adjusting one or more of injection pressure, injection quantity, and injection timing.

16. The method of claim 15, wherein the plurality of radial zones of the SCR catalyst comprises an inner radial zone and an outer radial zone, the method further comprising:
decreasing reductant injection pressure if an amount of reductant stored in the outer radial zone is greater than or equal to the reductant storage setpoint of the outer radial zone and an amount of reductant stored in the inner radial zone is less than the reductant storage setpoint of the inner radial zone; and
increasing reductant injection pressure if the amount of reductant stored in the outer radial zone is less than the reductant storage setpoint of the outer radial zone and the amount of reductant stored in the inner radial zone is greater than or equal to the reductant storage setpoint of the inner radial zone.

17. The method of claim 16, further comprising:
maintaining reductant injection pressure at a nominal level and decreasing a quantity of reductant injected if the amount of reductant stored in the outer radial zone is greater than or equal to the reductant storage setpoint of the outer radial zone and the amount of reductant stored in the inner radial zone is greater than or equal to the reductant storage setpoint of the inner radial zone; and
maintaining reductant injection pressure at the nominal level and increasing the quantity of reductant injected if the amount of reductant stored in the outer radial zone is less than the reductant storage setpoint of the outer radial zone and the amount of reductant stored in the inner radial zone is less than the reductant storage setpoint of the inner radial zone.

18. The method of claim 16, further comprising adjusting reductant injection timing to occur while a flow rate of exhaust gases entering the SCR catalyst rate is above a threshold if the amount of reductant stored in the outer radial zone is greater than or equal to the reductant storage setpoint of the outer radial zone and the amount of reductant stored in the inner radial zone is less than the reductant storage setpoint of the inner radial zone.

19. The method of claim 18, further comprising increasing a quantity of reductant injected if the amount of reductant stored in the outer radial zone is greater than or equal to the reductant storage setpoint of the outer radial zone and the amount of reductant stored in the inner radial zone is less than the reductant storage setpoint of the inner radial zone.

20. The method of claim 16, further comprising adjusting reductant injection timing to occur when a flow rate of exhaust gases entering the SCR catalyst is below a threshold if the amount of reductant stored in the outer radial zone is less than the reductant storage setpoint of the outer radial zone and the amount of reductant stored in the inner radial zone is greater than or equal to the reductant storage setpoint of the inner radial zone.

\* \* \* \* \*